United States Patent Office 3,562,272
Patented Feb. 9, 1971

3,562,272
PREPARATION OF 4-ARYL-2(1H)-
QUINAZOLINONES
Hans Ott, Pfeffingen, Basel-Land, Switzerland, assignor to Sandoz-Wander, Inc., Hanover, N.J., a corporation of Delaware
No Drawing. Filed Apr. 15, 1969, Ser. No. 816,383
Int. Cl. C07d 51/48
U.S. Cl. 260—251                                   5 Claims

ABSTRACT OF THE DISCLOSURE

The invention discloses preparation of 1-substituted-4-aryl-2(1H)-quinazolinones by subjecting their corresponding 1-substituted-4-aryl-quinazolin-2(1H)-thiones to hydrolysis in the presence of an alkali metal hydroxide at temperatures in the range of from 50° C. to 150° C.

---

The present invention relates to bicyclic compounds, and more particularly to the preparation of 1-substituted-4-aryl-2(1H)-quinazolinone of the Formula I:

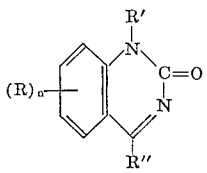

wherein

R is, independently, hydrogen, halo, preferably having an atomic weight no greater than 80, i.e., fluoro, bromo and chloro; lower alkyl, preferably containing 1 to 5 carbon atoms; lower alkoxy; nitro; lower alkylthio; or trifluoromethyl;
$n$ is 1 or 2, and when 2, R is the same or different and either hydrogen, halo, lower alkyl or lower alkoxy, as defined above;
R' is lower alkyl, preferably containing 1 to 5 carbon atoms, e.g., methyl, ethyl, propyl, isopropyl, butyl, sec-butyl and isobutyl; allyl; methallyl; or propargyl;
R" is phenyl; or substituted phenyl of the formula:

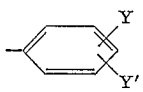

Y represents halo, lower alkyl, preferably containing from 1 to 4 carbon atoms, e.g., methyl and ethyl; lower alkoxy, preferably containing from 1 to 4 carbon atoms, e.g., methoxy and ethoxy; or trifluoromethyl; and
Y' represents hydrogen; halo; lower alkyl, preferably containing from 1 to 4 carbon atoms, e.g., methyl and ethyl; or lower alkoxy preferably containing from 1 to 4 carbon atoms, e.g., methoxy and ethoxy.

In accordance with the present invention the compounds of Formula I are prepared by subjecting a corresponding 1-substituted-4-aryl-quinazolin-2(1H)-thione of the Formula II:

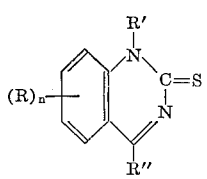

wherein R, R', R" and $n$ have the above-defined meaning, to hydrolysis at temperature in the range of from 10° C. to 150° C.

The preparation of compounds I in accordance with the invention is preferably carried out by subjecting a corresponding compound II to alkaline hydrolysis at elevated temperatures in the range of 50° C. to 150° C., preferably 80° C. to 120° C. The preferred reagent for effecting alkaline hydrolysis is an alkali metal hydroxide, e.g., sodium hydroxide or potassium hydroxide. The reaction is conveniently carried out in an aqueous solvent medium which is provided by a liquid system comprising water and an inert and water miscible organic solvent of conventional type such as the lower alkanols or cyclic ethers such as ethanol and dioxane, preferably dioxane. The reaction product of Formula I may be removed from the reaction mixture by working up by established procedures.

The quinazolinone of Formula I may be also produced in accordance with the invention by subjecting a corresponding compound II to oxidative hydrolysis in an aqueous medium at temperatures in the range of 10° C. to 80° C., preferably 15° C. to 60° C. The oxidative hydrolysis is preferably carried out in an alkaline medium employing as oxidizing agent a peroxide which is preferably a hydroperoxide, more preferably hydrogen peroxide. The peroxide oxidizing agent is preferably employed in moderate excess, typically about a 1.5 to 4 molar equivalent excess. An alkali metal hydroxide, e.g., sodium hydroxide or potassium hydroxide, is desirably employed to provide the alkaline conditions for the peroxide oxidation and such alkali metal hydroxide is suitably employed in large excess. The alkaline oxidative hydrolysis is conveniently carried out in an aqueous solvent medium which is provided by a liquid system comprising water and an inert and water miscible organic solvent of conventional type such as the lower alkanols or cyclic ethers. Alternatively, the oxidative hydrolysis may be carried out in an acidic medium employing as oxidizing agent an organic peracid, e.g., peracetic acid. The acidic medium is preferably provided by employing aqueous acetic acid, preferably in substantial excess. Organic solvents of the conventional type indicated for use in the alkaline oxidative hydrolysis may also be employed in the acidic oxidative hydrolysis. In general, the reaction product of Formula I may be recovered from the oxidative hydrolysis procedures by working up in a known manner.

A preferred procedure for preparation of the starting compounds of Formula II involves cyclizing a 2-aminobenzophenone of Formula III:

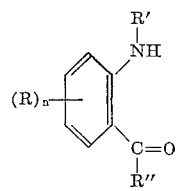

wherein R, R', R" and $n$ are as defined, by subjecting said compound III to the action of an acid halide and isothiocyanate of the Formula IV:

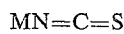

wherein M is a cation, or to the action of the reaction product of said acid halide and isothiocyanate.

The preparation of compounds II from a compound III is conveniently carried out in an inert solvent medium at temperatures in the range of 10° C. to 80° C., preferably 30° C. to 70° C. The reaction may be understood as including the reaction of compound II with the reaction product of an acid halide and isothiocyanate of Formula IV. For this reason, it is generally preferred to first react the acid halide and compound IV and then add the starting compound III to the resulting reaction mixture. The reaction of the acid halide and compound IV is exothermic and preferably initiated at lower temperatures in the range of 10° C. to 30° C. As acid halides one employs any of several acid halides which do not carry substituents or functional groups interfering with the cyclization. The more suitable materials are represented, for example, by acetyl chloride and benzoyl chloride, preferably benzoyl chloride. The preferred compounds IV are those most readily reacting with the acid halide to eliminate as byproduct a halide of the cation M of the compound IV. The preferred cations M may be represented, for example, by a cation of an alkali metal, e.g., sodium, and by the cation of ammonia, e.g., the ammonium salt. The more preferred compound IV is ammonium isothiocyanate. Organic solvents suitable for the reaction are of conventional type which provide an inert medium. Such solvents include by way of example ketones and cyclic ethers, preferably acetone. It has been demonstrated that the reaction of compounds III with the acid halide and isothiocyanate, or reaction product thereof, results directly in a high yield of compounds II. In other situations where the starting compounds III bear certain substituents such as represented by R in Formula III being lower alkyl, e.g., 4-methyl - 2 - isopropylamino - benzophenone, it has been found that the reaction results in a mixture of products including the desired compound II and a noncyclized byproduct which may even represent the major product of the reaction. In such situations it has been found that such reaction mixtures may be treated with a strong base at elevated temperatures to cyclize the previously noncyclized byproduct to the desired compound II in high yield. Such treatment of the reaction mixtures containing the noncyclized byproduct is suitably effected in the range of 60° C. to 100° C. in the presence of an alkali metal hydroxide such as sodium hydroxide or potassium hydroxide in an aqueous solvent medium comprising water and an inert organic solvent of known type such as a cyclic ether, e.g., dioxane. The preparation of the thiones of Formula II by cyclization of a benzophenone is suitably applied to the preparation of compounds II in which Y and/or Y' is other than an ortho-substituent. In general, the reaction products of Formula II may be recovered by working up by established procedures.

The compounds of Formula II may also be alternatively prepared by cyclizing a compound III with isothiocyanic acid at elevated temperatures.

The production of compounds II by cyclizing a compound III with isothiocyanic acid is carried out at elevated temperatures in the range of 50° C. to 150° C., more preferably 100° C. to 140° C. The isothiocyanic acid reacted with compound III to obtain compound II is well known to be unstable and is therefore desirably provided in the form of a salt of the Formula IVA, as follows:

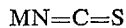 

wherein M is a cation readily eliminated in an acidic medium to permit formation of the desired isothiocyanic acid, said cation M preferably being a cation of an alkyl metal, e.g., sodium or potassium; or the cation of ammonia, i.e., the ammonium salt. The preferred compound IVA is ammonium isothiocyanate. The acid employed to produce in situ the desired isothiocyanic acid from compound IVA is preferably a lower ' carboxylic acid, desirably acetic acid, which may also be conveniently employed as solvent for the reaction. The reaction product of Formula II may be isolated from the reaction mixture by conventional procedures. The preparation of compounds II by the cyclization of a compound III with isothiocyanic acid and the preparation of said compounds II by reaction of a compound II with an isothiocyanate and an acid halide are considered distinct reactions because, inter alia, of a different mechanism and/or formation of different intermediates leading to the desired compound II.

The starting materials employed in producing compound II as above-described are either known or readily prepared from known materials by established procedures.

It will be noted of interest that the compounds II may be prepared from compounds I by treating the latter with phosphorus pentasulfide at elevated temperatures in the range of 90° C. to 180° C., preferably at reflux temperatures between 100° C. to 130° C., in an organic solvent which is preferably pyridine. Alternate procedures for producing a compound of Formula I include the cyclization of a compound III with urethane in the presence of zinc chloride in an organic solvent or excess carbamate at temperatures between 160° C. to 200° C., by cyclization of a 2-aminobenzophenonimine with phosgene at temperatures preferably between 10° C. to 30° C. in an organic solvent such as benzene, or by reaction of a corresponding 1-alkali metallo quinazolinone with an alkyl halide such as methyl iodide at about room temperature in an organic solvent such as dimethylacetamide.

The compounds of structural Formula I (and their pharmaceutically acceptable acid addition salts) are useful because they possess pharmacological activity in animals. In particular, the compounds are useful as antiinflammatory agents as indicated by the Carrageenan-induced edema test on rats. For such usage, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon known factors such as the compounds used and the mode of administration. However, in general, satisfactory results are obtained when administered at a daily dosage of from about 0.15 milligram to about 100 milligrams per kilogram of body weight, preferably given in divided doses 2 to 4 times a day, or in sustained release form. For most mammals the administration of from about 10 milligrams to about 1000 milligrams if the compound per day provides satisfactory results and dosage forms suitable for internal administration comprise from about 3 milligrams to about 500 milligrams of the compound in admixture with a solid or liquid pharmaceutical carrier or diluent.

The following examples are for purposes of illustration only.

EXAMPLE 1

1-isopropyl-4-phenyl-2(1H)-quinazolinone

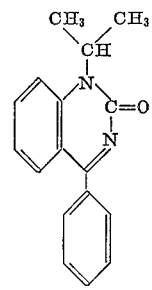

(Step A). Preparation of 0-isopropylaminobenzophenone.—A mixture of 20 g. of o-aminobenzophenone, 10 g. of sodium carbonate and 50 ml. of isopropyl iodide is refluxed with stirring for 5 days. The excess isopropyl iodide is then evaporated off in vacuo, and the resulting residue extracted with 200 ml. of benzene. The benzene extract is then filtered, washed twice with 100 ml. (each) of water, dried over anhydrous sodium sulfate, filtered and evaporated to dryness in vacuo to obtain o-isopropylaminobenzophenone as an oil.

(Step B). Preparation of 1-isopropyl-4-phenyl-quinazolin-2(1H)-thione.—To a solution of 11.3 g. of ammonium isothiocyanate in 100 ml. of acetone at room temperature is added dropwise 18.8 g. of benzoylchloride. The resulting suspension is refluxed for 5 minutes, cooled and there is then added 30 g. of o-isopropylaminobenzophenone. The resulting mixture is refluxed for 3 hours, cooled, evaporated in vacuo, suspended in methylene chloride, insoluble material filtered off, and the filtrate evaporated followed by crystallization from ethyl acetate/diethyl ether to obtain 1-isopropyl-4-phenyl-quinazolin-2(1H)-thione, M.P. 212–214° C.

(Step C). Preparation of 1-isopropyl-4-phenyl-2(1H)-quinazolinone.—To a solution of 5 g. of 1-isopropyl-4-phenyl-quinazolin-2(1H)-thione in 100 ml. of dioxane is added 50 ml. of 25% sodium hydroxide solution, and the resulting mixture is refluxed for 16 hours, poured onto ice-water, extracted twice with ethyl acetate, washed with saturated sodium chloride solution, then with water and dried. The resulting solution is evaporated in vacuo to crystallize 1-isopropyl-4-phenyl-2(1H)-quinazoline, M.P. 131–135° C.

EXAMPLE 2

1-isopropyl-7-methyl-4-phenyl-2(1H)-quinazoline

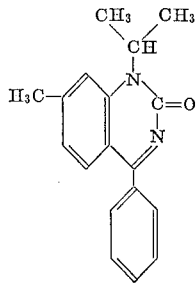

(Step A). Preparation of 4-methyl-2-isopropylaminobenzophenone.—A mixture of 7 g. of 4 methyl-2-aminobenzophenone, 6.35 g. of sodium carbonate and 18.8 ml. of 2-iodopropane is stirred and refluxed for 3 days. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting yellow oil is dissolved in about 10 ml. of methylene chloride and subjected to column chromatography employing alumina (about 400 g.) and methylene chloride as eluant to give a first fraction which on concentration in vacuo to remove methylene chloride produced a yellow oil of 4-methyl-2-isopropyl-aminobenzophenone.

(Step B). Preparation of 1-isopropyl-7-methyl-4-phenyl-quinazolin-2(1H)-thione.—To a solution of 3.5 g. of ammonium isothiocyanate in 100 ml. of acetone at room temperature is added dropwise 6.2 g. of benzoylchloride. The resulting suspension is refluxed for 5 minutes, cooled and there is then added 10 g. of 4-methyl-2-isopropyl-aminobenzophenone. The resulting mixture is refluxed for 3 hours, cooled, evaporated in vacuo, and the residue dissolved in 500 ml. of tetrahydrofuran. To the resulting solution is added 50 ml. of 2 N NaOH followed by refluxing on a steam bath for 1 hour. The resulting mixture is evaporated to remove the solvent and the mixture extracted with methylene chloride, the organic phase dried and evaporated in vacuo to obtain an oil which is crystallized from ethanol/diethyl ether to obtain 1-isopropyl-7-methyl-4-phenyl-quinazolin-2(1H)-thione, M.P. 185–190° C.

(Step C). Preparation of 1-isopropyl-7-methyl-4-phenyl-2(1H)-quinazolinone.—Following the procedure of Step C of Example 1, and employing approximately similar proportions, 1-isopropyl-7-methyl-4-phenyl-quinazolin-2(1H)-thione is hydrolyzed with sodium hydroxide followed by crystallization from ethyl acetate to obtain 1-isopropyl-7-methyl-4-phenyl-2(1H)-quinazolinone, M.P. 137–138° C.

EXAMPLE 3

Following the procedure of the preceding examples and employing the appropriate corresponding starting materials in approximately similar proportions, the invention is further exemplified as follows:

(A) Preparation of 1-ethyl-4-phenyl-quinazolin-2(1H)-thione, M.P. 232–235° C. and hydrolysis thereof to 1-ethyl-4-phenyl-2(1H)-quinazolinone, M.P. 183–185° C.

(B) Preparation of 6-chloro-1-methyl-4-phenyl-quinazolin-2(1H)-thione, M.P. 228–230° C. and hydrolysis thereof to 6-chloro-1-methyl-4-phenyl-2(1H)-quinazolinone, M.P. 223–224° C.

(C) Preparation of 1-isopropyl-6-methoxy-4-phenyl-quinazolin-2(1H)-thione and hydrolysis thereof to 1-isopropyl-6-methoxy-4-phenyl-2(1H)-quinazolinone, M.P. 140–143° C.

(D) Preparation of 1-allyl-4-phenyl-quinazolin-2(1H)-thione, M.P. 180° C., and hydrolysis thereof to 1-allyl-4-phenyl-2(1H)-quinazolinone, M.P. 159–160° C.

What is claimed is:

1. The process for preparation of a 1-substituted-4-aryl-2(1H)-quinazolinone of the formula:

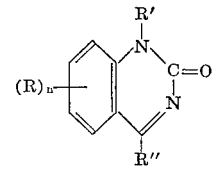

wherein

R is, independently, hydrogen, halo having an atomic weight no greater than 80, lower alkyl, lower alkoxy, nitro, lower alkylthio, or trifluoromethyl;
n is 1 or 2, and when 2, R is the same or different and either hydrogen, halo, lower alkyl or lower alkoxy;
R' is lower alkyl, allyl, methallyl, or propargyl;
R" is phenyl, or substituted phenyl of the formula:

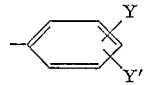

Y represents halo, lower alkyl, lower alkoxy or trifluoromethyl; and
Y' represents hydrogen, halo, lower alkyl, or lower alkoxy;

said process consists essentially of subjecting a corresponding 1-substituted-4-aryl-quinazolin-2(1H)-thione of the formula:

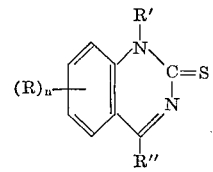

where R, R', R" and n are as above-defined, to hydrolysis in the presence of an alkali metal hydroxide at a temperature in the range of from 50° C. to 150° C.

2. The process of claim 1 in which the hydrolysis is effected with an alkali metal hydroxide from the group of sodium hydroxide and potassium hydroxide.

3. The process of claim 2 in which the temperature is in the range of 80° C. to 120° C.

4. The process of claim 3 in which the hydrolysis is carried out in a reaction medium comprising a solution of water and an organic solvent from the group of the lower alkanols and dioxane.

5. The process of claim 4 in which the reaction mixture comprises a solution of water and dioxane.

References Cited

Theilheimer: "Synthetic Methods of Org. Chem.," vol. 17 (1963), Kargel Publishers p. 119.

ALEX MAZEL, Primary Examiner

R. V. RUSH, Assistant Examiner

U.S. Cl. X.R.

424—251